US009453715B2

(12) United States Patent
Stusak

(10) Patent No.: US 9,453,715 B2
(45) Date of Patent: Sep. 27, 2016

(54) DEVICE FOR DETECTING POSITION OF ROTATING WORKING MEANS IN ACTIVE MAGNETIC BEARING

(71) Applicant: Miroslav Stusak, Chocen (CZ)

(72) Inventor: Miroslav Stusak, Chocen (CZ)

(73) Assignee: RIETER CZ S.R.O. (CZ)

( * ) Notice: Subject to any disclaimer, the term of this patent is extended or adjusted under 35 U.S.C. 154(b) by 66 days.

(21) Appl. No.: 14/199,570

(22) Filed: Mar. 6, 2014

(65) Prior Publication Data

US 2014/0285186 A1 Sep. 25, 2014

(30) Foreign Application Priority Data

Mar. 22, 2013 (CZ) ..................................... 2013-205

(51) Int. Cl.
*G01B 7/14* (2006.01)
*G01B 7/30* (2006.01)
*H01F 5/00* (2006.01)
(Continued)

(52) U.S. Cl.
CPC ............... *G01B 7/30* (2013.01); *G01D 5/2046* (2013.01); *F16C 32/0446* (2013.01)

(58) Field of Classification Search
CPC .......... G01B 7/14; G01B 7/30; G01B 7/144; G01B 7/305; G01B 7/31; G01B 7/312; G01D 5/2046; G01D 5/20; G01D 5/2006; G01D 5/2013; G01D 5/202; G01D 5/204; G01D 5/2053; G01D 5/22; G01D 5/2208; G01D 5/2216; G01D 5/2225; G01D 5/225; G01D 5/2258; G01D 5/2266; G01D 5/2275; F16C 32/04; F16C 32/048; F16C 32/0446; F16C 32/0451; F16C 32/0476; F16C 32/0453; F16C 32/0455; F16C 32/0474; D01H 4/00; H02K 7/09

USPC ............ 324/207.11–207.17, 207.22, 207.25, 324/207.18, 207.23, 207.26; 310/90.5, 68, 310/90; 57/400, 404, 406; 340/382
See application file for complete search history.

(56) References Cited

U.S. PATENT DOCUMENTS 3,609,580 A * 9/1971 Thompson ............... G01H 1/10
324/207.16
4,839,550 A * 6/1989 Mizuno ............... F16C 32/0451
310/90.5
4,924,180 A * 5/1990 Nasr ....................... F16C 17/24
324/207.15

(Continued)

FOREIGN PATENT DOCUMENTS

CZ 20423 1/2010
CZ 302 646 8/2011
(Continued)

OTHER PUBLICATIONS

Czech Republic Search Report dated Nov. 12, 2013 (1 page).

*Primary Examiner* — Arleen M Vazquez
*Assistant Examiner* — Steven Yeninas
(74) *Attorney, Agent, or Firm* — Ostrolenk Faber LLP

(57) ABSTRACT

A device for detecting position of a rotating working means in an active magnetic bearing which comprises sensors (A, B) of the position of a rotating working means, detectors (D) of an output signal of the sensors (A, B) and evaluation circuits connected to control system of the active magnetic bearing. The sensors (A, B) of the position are composed of high frequency transformers, each of which is directly connected to the detector (D) of its output signal and the detectors (D) are composed of an electrical quadrupole with a non-linear transfer characteristic.

17 Claims, 6 Drawing Sheets

(51) Int. Cl.
*G01D 5/20* (2006.01)
*F16C 32/04* (2006.01)

(56) References Cited

U.S. PATENT DOCUMENTS

| | | | | |
|---|---|---|---|---|
| 5,003,260 | A * | 3/1991 | Auchterlonie | G01B 7/14 324/207.16 |
| 5,621,315 | A * | 4/1997 | Ikeuchi et al. | 324/207.12 |
| 6,566,862 | B1 * | 5/2003 | Goto | G01D 3/0365 324/207.16 |
| 6,707,187 | B1 * | 3/2004 | Gabrys | H02K 7/025 310/74 |
| 6,787,955 | B1 * | 9/2004 | Ueyama | 310/90.5 |
| 7,098,654 | B2 * | 8/2006 | Mehnert | G01P 3/487 324/207.24 |
| 7,106,052 | B2 * | 9/2006 | Ehls et al. | 324/207.12 |
| 2003/0146727 | A1 | 8/2003 | Ishii | |
| 2004/0207391 | A1 * | 10/2004 | Momose | G01D 5/204 324/207.17 |
| 2005/0179333 | A1 * | 8/2005 | Kawashima | F04D 19/048 310/90.5 |
| 2008/0246467 | A1 * | 10/2008 | Vial | G01D 5/2033 324/207.25 |
| 2010/0072987 | A1 * | 3/2010 | Nakano | G01D 5/2291 324/207.15 |
| 2010/0085039 | A1 * | 4/2010 | Goto | G01D 5/2013 324/207.18 |
| 2012/0038294 | A1 * | 2/2012 | Schulz et al. | 318/8 |
| 2014/0252899 | A1 * | 9/2014 | Looser | 310/90.5 |

FOREIGN PATENT DOCUMENTS

| | | |
|---|---|---|
| EP | 1 058 094 | 6/2000 |
| EP | 1 083 408 | 3/2001 |
| JP | 63-205532 | 8/1988 |
| JP | 11 094589 | 4/1999 |
| JP | 2000078809 | 3/2000 |
| JP | 2002174199 | 6/2002 |

* cited by examiner

DEVICE FOR DETECTING POSITION OF ROTATING WORKING MEANS IN ACTIVE MAGNETIC BEARING

TECHNICAL FIELD

The invention relates to a device for detecting position of a rotating working means in an active magnetic bearing which comprises sensors of the position of the rotating working means, detectors of the output signal of the sensors and an evaluation circuits connected to control system of the active magnetic bearing.

BACKGROUND ART

For the purpose of bearing very fast-rotating working means, for example spinning rotors of open-end spinning machines, there are special devices which by means of controlled magnetic forces maintain the position of the rotating working means. Such devices are generally known as active magnetic bearings.

In order to ensure levitation of the rotating working means, which is the function of the bearing, by means of the active magnetic bearing, it is essential to know the instantaneous position of the rotating working means in the magnetic field of the active magnetic bearing, as well as possible changes of this position over time in a three-dimensional rectangular coordinate system with the axes x, y, z, which is a fundamental prerequisite for the active stabilization of the rotation axis of the rotating working means in space. Also, the rotating working means must be maintained in the required position by a regulation (controlling) device on the basis of continuously registered and evaluated data in order to avoid an accident of the rotating working means under the influence of variations of the rotating working means leading to all the negative consequences caused by the high speed of the rotation of the rotating working means, e.g. an accident due to the contact of the rotating working means with the other parts of the active magnetic bearing.

To determine the position of the rotating working means in a magnetic field, it is usual to use sensors based on employing the principle of vortex currents by means of a measuring electrical coil or a pair of coils with a mutual inductive coupling. The change of the position of the rotor in the magnetic field of the active magnetic bearing evokes a change in AC voltage on the measuring electrical coil, which is actuated by AC voltage either through direct coupling or through inductive coupling from the other coil. The output signal of the coil in the form of the AC voltage on the measuring coil is subsequently processed by a detector. The amount (amplitude) of this AC voltage induced then depends on the position of the spinning rotor in the magnetic bearing, whereby the value of the amount of the voltage induced is obtained with the aid of the above-mentioned detector, which in actual fact carries out the regulation of the AC voltage induced, and so the amount of the regulated voltage induced corresponds to the position of the spinning rotor with respect to the position sensor. Known systems of induced voltage usually work with frequencies in the order of tens to hundreds of kilohertz, possibly in the order of single megahertz, which requires using sensing coils with a plurality of threads, or, as the case may be, it requires using flat coils having relatively large dimensions, usually disposed in a plane perpendicular to the rotation axis of the working means. The production of such coils is generally technologically demanding with regard to serial production requirements, such as small tolerances, parameter stability and low cost. Moreover, when using larger coils, a problem arises during detecting the position of a rotating working means whose diameter is small in comparison with these coils, as is, for example, the diameter of the driving shaft.

The simplest known detectors applicable in this field are plain or various types of compensated diode rectifiers, whose disadvantage, however, is the fact that they are not able to detect small induced voltages in the order of milivolts with sufficient accuracy and stability. Another drawback of these detectors is their temperature dependability. So as to achieve greater accuracy or temperature stability, it is often necessary to set these detectors individually. In some cases also an amplifier, often a selective one, is positioned between a sensing coil and a detector. See, for example, CZ 302 646.

Generally speaking, a method of detecting small signals which uses various types of synchronnic or generally controlled rectifiers with semiconductive switches is considered to be very accurate. However, the disadvantage is a certain limitation of the working frequency in the order of single MHz and mostly also a greater complexity and therefore the price of detectors which are based on this principle. Nevertheless, in active magnetic bearings in which high speed is achieved—as high as more than 100.000 $min^{-1}$, even in the case of these detectors a problem emerges with detection and evaluation of very low AC voltages coming from the sensors of the position of the spinning rotor working on the above-mentioned principle of vortex currents, which is caused especially by the effect of the electromagnetic disturbance arising during the operation of the active magnetic bearing, particularly its actuator coils. Also, the working frequency of the actuator coils of the active magnetic bearing tends to be low, often nearing the frequency at which the detectors work, which means that it is usually difficult to eliminate this disturbance.

Generally, a method of using detectors of alternating signals is known, in which the detectors are based on the principle of non-linearity of a transfer characteristic of a quadrupole, preferably the so-called field-effect transistor. However, the output signals from such detectors are not directly proportional to changes of AC voltage on the measuring electrical coils of the position sensors and therefore it is usually necessary to correct them by a DC correction signal.

CZ patent No 302 646 discloses a method of stabilization of a levitating rotating element (LRE) by means of high frequency inductive position sensors connected to evaluation circuits (detectors) of output signals of sensors. In actual fact, the whole system is made up of a flat high-speed electrical motor with a magnetic bearing whose rotor is composed of a levitating and rotating element, i.e. of the spinning rotor of an open-end spinning machine. Inductive position sensors LRE are arranged in close proximity to the outer circuit LRE and are disposed along the circumference of LRE in three pairs, whereby all these three pairs of position sensors are disposed in one common plane perpendicular to the rotation axis LRE. High frequency inductive position sensors work at frequencies in hundreds of kHz. LRE is made of ferromagnetic material, whereby each of the high frequency inductive position sensors is in essence made up of a flat transformer with flat windings arranged on opposite sides of the printed circuit board and lying in a plane perpendicular to the rotation axis of the spinning rotor. Primary windings (actuator windings) of both sensors of each pair of sensors are connected to the branch of the power output of a high frequency (actuator) generator of a specific signal, secondary windings of one sensor of each pair of sensors is connected with the inlet of a narrow-band elimination filter and secondary winding of the other of each pair of sensors is connected to the inlet of the other narrow-band elimination filter. The output signal of each pair of sensors is first processed (amplified) on AC level and only afterwards it is supplied to a high frequency rectifier, to the outlet of which is connected the inlet of a smoothing filter, which is by its outlet connected to the inlet of a digital signal processor. Although this arrangement to a certain extent reduces the negative influence of the disturbing background created by the principle itself of the function of the magnetic bearing due to using narrow-band filters in the path of AC signal, its disadvantages are complexity and insufficient thermal stability. Moreover, this arrangement requires the individual setting of the central position of the rotation axis of LRE (rotor) by means of setting elements, which makes the device even more demanding and it is difficult to find practical applications for this solution. In addition, this solution does not enable to detect a possible inclination of the rotation axis of LRE in relation to the optimal rotation axis of LRE, i.e. tilting of the rotor, whereby this possible inclination can lead to to the contact of the fast-rotating LRE with the other parts of the active magnetic bearing, which may result in an accident of the whole system, including destruction of the device and threatening the health of the operating staff. Due to a relatively low working frequency of the position sensors, the system is also sensitive to the material of which the spinning rotor is made in the area adjacent to the sensor, since the depth of penetration of the electromagnetic field into the material of the rotor is considerably great. The surface phenomenon, the so-called skin effect, is applied here only to a lesser extent.

The aim of the invention is to eliminate or at least reduce the drawbacks of the background art, especially to improve the parameters of detecting the position of the rotating working means in an active magnetic bearing.

SUMMARY OF THE INVENTION

The aim of the invention is achieved by a device for detecting position of a rotating working means in an active magnetic bearing, whose principle consists in that the position sensors are composed of high frequency transformers, each of which is directly connected to the detector of its output signal and the detectors are composed of an electric quadrupole with a non-linear transfer characteristic. It is advantageous if the sensors are created on a double-sided or multi-layer printed circuit, located parallel to the sensed surfaces of the rotating working means and are fed (actuated) by a high frequency signal having a frequency higher than 20 MHz. Position sensors conceived in this manner, working at frequencies higher than 20 MHz, created by the technology of printed circuits, can be very small in size and it is easy to achieve high reproducibility and small variability of parameters in serial production. These position sensors can be preferably implemented on a multi-layer printed circuit, wherein any of the two windings can be arranged on the inner layer of this printed circuit, which provides greater consistency of parameters and allows an optimal solution to topology and outlets of these position sensors. Moreover, the edge layers of the multi-layer printed circuit can be then preferably used as protection of the flat winding from unfavourable external influences.

The advantage of this solution compared to the background art consists in the improvement in the function of monitoring changes of the position of a rotating working means in an active magnetic bearing. Due to a higher working frequency of the position sensors it is carried out with sufficient speed and required accuracy as well as reliability of the results of the measurement, which is also enabled by a high speed of the rotation of the working means, the influence of the material used for the construction of the working means being eliminated.

BRIEF DESCRIPTION OF THE DRAWINGS

The invention is schematically represented in the drawings, where.

DESCRIPTION OF PREFERRED EMBODIMENTS

The invention will be described on an example of embodiment of a device for detecting the position of the spinning rotor in an active magnetic bearing, where the rotating working means is composed of the spinning rotor of an open-end spinning machine.

Figure 1:
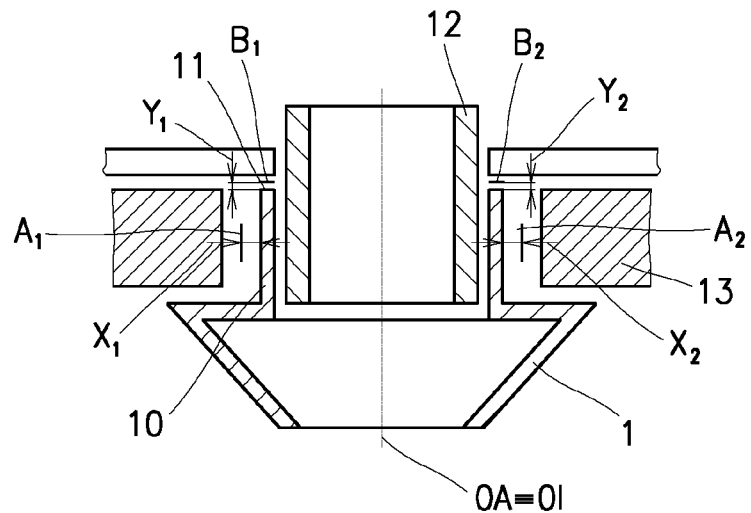
FIG. 1 shows an example of arrangement of an active magnetic bearing with a shaftless spinning rotor and a system of sensors of the position of the spinning rotor, FIG. 2 an example of arrangement of an active magnetic bearing with a spinning rotor on a shaft and a system of sensors of the position of the spinning rotor, or the shaft.
Figure 2:
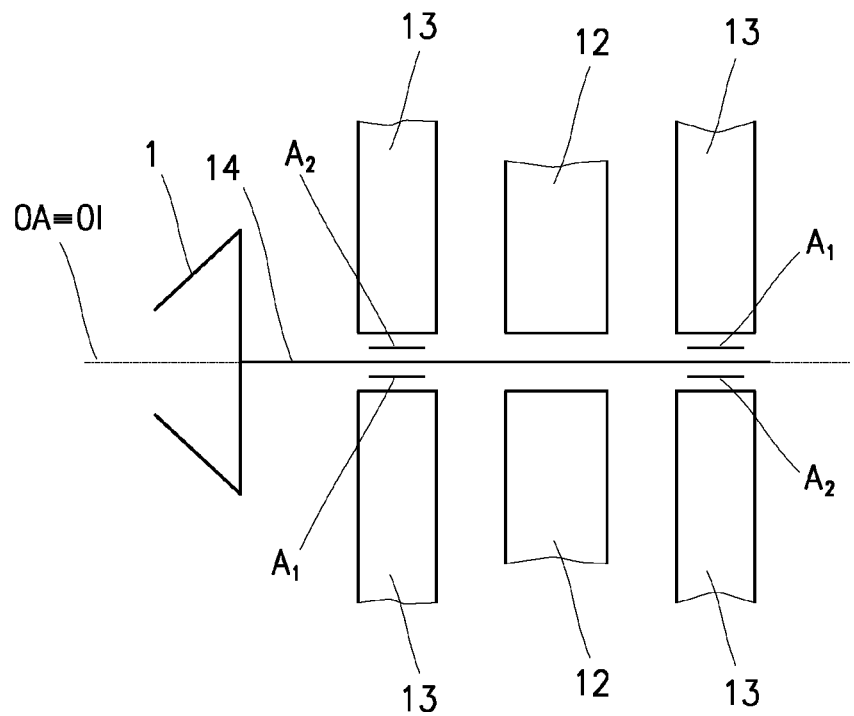

An open-end spinning machine comprises at least one row of operating units situated next to each other. Apart from a number of other spinning components, each operating unit comprises also a spinning unit in which is arranged an active magnetic bearing in which a spinning rotor 1 is rotatably mounted. The active magnetic bearing ensures maintaining the position of the spinning rotor 1 in the spinning unit in relation to the other parts of the spinning unit by means of an illustrated electromagnetic stabilization system 13. FIG. 1 shows the so-called shaftless spinning rotor 1, FIG. 2 represents a spinning rotor 1 on the shaft 14. The drive of the spinning rotor is ensured by a driving system 12.

By the position of the spinning rotor 1 we understand the placement of the spinning rotor 1 in a three-dimensional coordinate system, including the position of the current rotation axis OA of the spinning rotor 1, i.e. the actual rotation axis of the spinning rotor 1, in relation to the authentic rotation axis OI of the spinning rotor 1, which is determined by the geometry of the active magnetic bearing, the spinning unit and the spinning rotor 1.

The position of the current rotation axis OA is detected by the system of detecting the position of the rotating working means, i.e. the spinning rotor 1, in the active magnetic bearing. The system of detecting the position comprises sensors A, B of the position of the spinning rotor 1, which are coupled with detectors D of the output signals of the sensors A, B, with evaluation circuits and the control device.

Figure 3A:
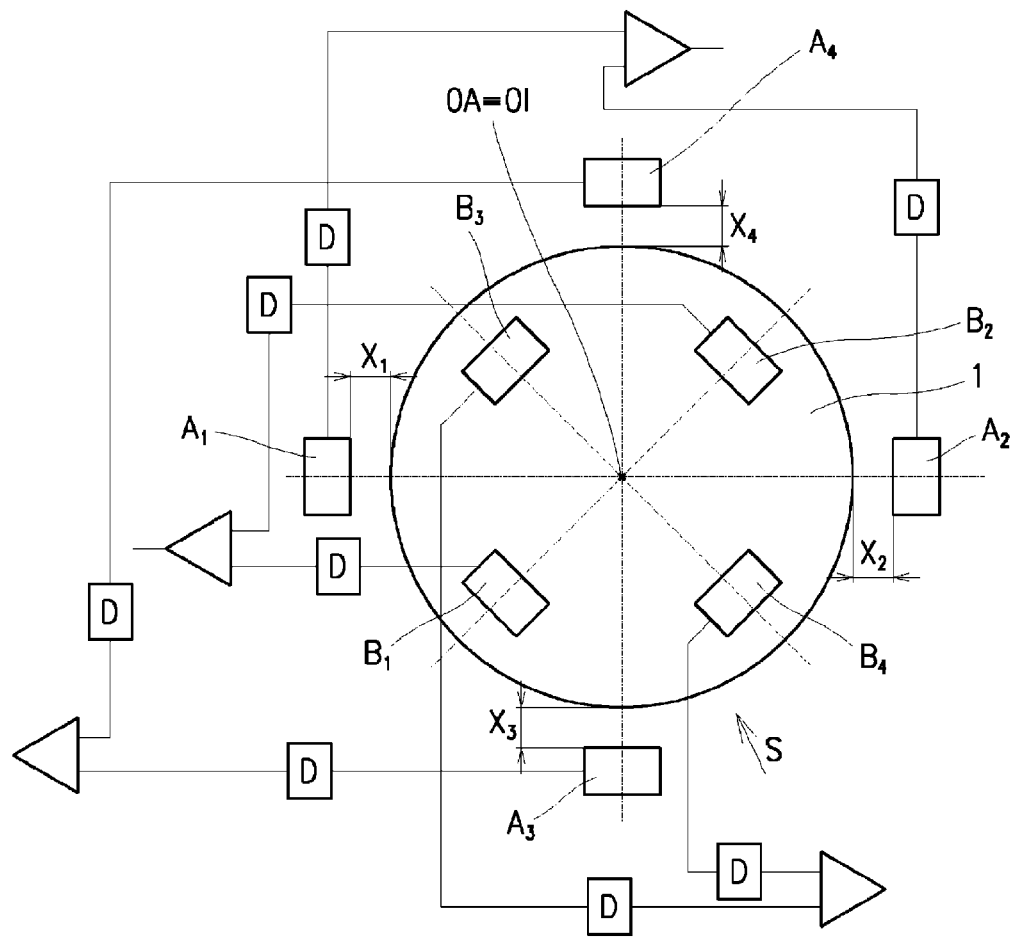
FIG. 3a shows an example of embodiment of position sensors and detectors and their arrangement in relation to the spinning rotor in a top view.
Figure 3B:
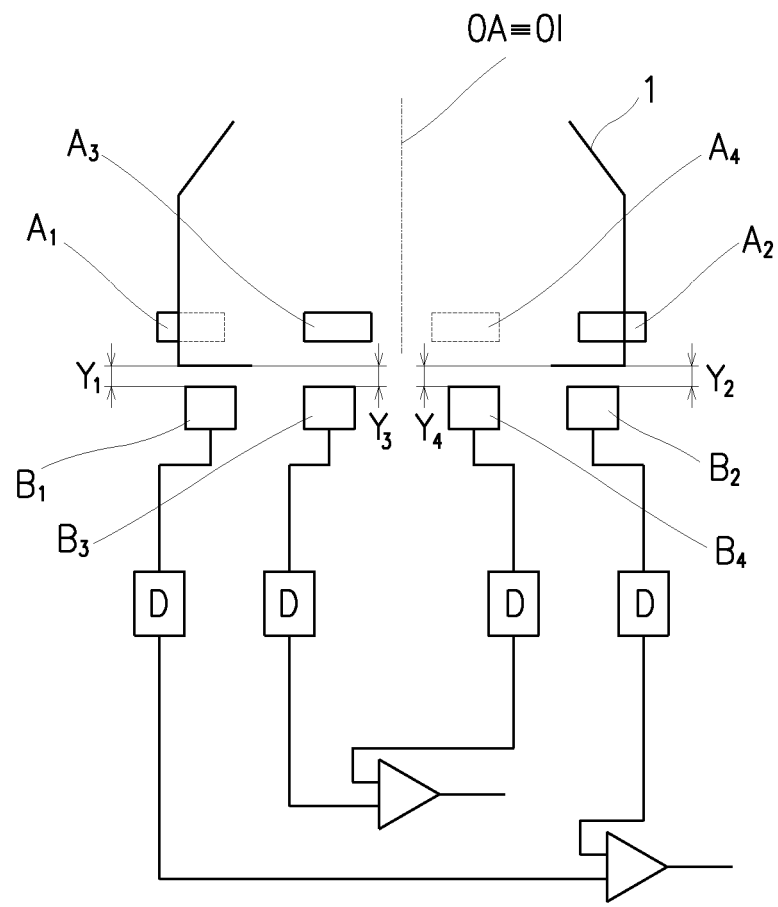
FIG. 3b represents a view in a direction of the arrow S from FIG. 3a, FIG. 4 shows a general arrangement of a quadrupole with a non-linear transfer characteristic.

In the so-called shaftless spinning rotor 1 the embodiment according to FIGS. 1, 3a, 3b, for the purpose of detecting the position, uses a specific geometric arrangement of two pairs, that is on the whole four sensors A of the position of the spinning rotor 1 for detecting radial shifting of the spinning rotor 1 and two pairs, that is on the whole four sensors B of the position of the spinning rotor 1 for detecting the inclination of the spinning rotor 1 in an active magnetic bearing and subsequent specific processing of their output signals to achieve accurate, reliable and fast detection of the size (amplitude) of the output signals of the sensors A, B. The sensors A, B are arranged in such a manner that they allow the differential processing of the output signals of each pair of sensors A, B.

In the embodiment in FIGS. 1 and 3a, 3b individual sensors A1, A2, A3, A4, B1, B2, B3, B4 in principle detect the distances X1, X2, X3, X4, Y1, Y2, Y3, Y4 of the surface of the spinning rotor 1 from a respective sensor A1, A2, A3, A4, B1 B2, B3, B4, or detect changes in these distances X1, X2, X3, X4, Y1, Y2, Y3, Y4.

The sensors A1, A2, A3, A4, B1, B2, B3, B4 of the position of the spinning rotor 1 are resistant to the magnetic and electrostatic field, whereby, being sufficiently sensitive, they ensure a sufficient signal corresponding to the shift of the rotating working means, i.e. the spinning rotor 1 or the shaft 14, by a hundredth of mm (0.01 mm) in a direction perpendicular to the surface of the sensor, regardless the material used for the construction of the spinning rotor due to very low penetration of a high frequency field into the surface of the material (the so-called. skin effect).

Preferably the sensors A1, A2, A3, A4, B1, B2, B3, B4 are made as high frequency transformers composed of a pair of coils arranged on opposite surfaces of the printed circuit board and located parallel to the surfaces of the spinning rotor, whose position they monitor.

It is advantageous if the sensors A1, A2, A3, A4 for detecting a radial shift of the spinning rotor 1 are located near the edge of a through-hole in the printed circuit board and the spinning rotor 1, or the shaft 14, passes through this hole in the printed circuit board, and so the sensors A1, A2, A3, A4 are situated opposite the cylindrical wall 10 of the spinning rotor 1, or opposite the cylindrical circumference of the shaft 14, whereby the diameter of the through-hole in the in the printed circuit board is only a little greater, typically for example by 2 mm, than is the outer diameter of the the spinning rotor 1 in the embodiment according to FIG. 1 or the outer diameter of the shaft 14 in the embodiment according to FIG. 2.

The sensors B1, B2, B3, B4 for detecting the inclination of the spinning rotor 1 are disposed on a separate printed circuit board situated approximately 1 mm below or above the level of the lower or upper monitored wall 11 of the spinning rotor 1, i.e. the wall 11, which is perpendicular to the rotation axis OA of the spinning rotor 1. Alternatively, the sensors B1, B2, B3, B4 are positioned in the embodiment according to FIG. 1 near the edge of a through-hole in the printed circuit board, whereby this through-hole has a smaller diameter than is the outer diameter of the spinning rotor 1, so that the sensors B1, B2, B3, B4 can be arranged directly opposite the wall 11 of the spinning rotor, which is perpendicular to the rotation axis OA of the spinning rotor 1, for example opposite the bottom of the spinning rotor 1, which is beneficial especially in a shaftless spinning rotor 1 according to the embodiment in FIG. 1.

The above-mentioned type of arrangement when all the essential components are always arranged on printed circuit boards, or on a common printed circuit board, together with using the below-mentioned high exciting frequency of the sensors A, B eliminates, or at least substantially reduces, an occurrence of induced disturbing signals, thus enhancing the sensitivity of the sensors A, B made up of high frequency transformers with a pair of coils. At the same time, this embodiment of the sensors A, B also enables an easy installation directly into the spinning unit of an open-end spinning machine, including a possibility of high integration, since it is possible to integrate in actual fact the complete electronics of the active magnetic bearing on theprinted circuit boards with sensors A, B or it is possible to interconnect these boards with the electronics of the active magnetic bearing.

The sensors A, B, composed of high frequency transformers with pairs of coils on a common printed circuit board, are at their inlet excited by a high frequency exciting signal having a frequency in the order of at least tens of MHz, however, typically having a frequency in the range from tens of MHz to hundreds of MHz, especially a frequency from 20 MHz and above. This results in achieving a considerable frequency separation of the measuring signal from the disturbing signals, which arise during the operation of the magnetic bearing. At the same time it is advantageous to employ the influence of the surface phenomenon (the so-called skin effect), i.e. the low extent of the penetration of the measuring electromagnetic field from the sensors A, B, created as high frequency transformers s pairs of coils, into the surface of the rotor 1. This solution enables to ensure the independence of the function of detecting the position of the rotor 1 on the used material of the rotor 1, and, as a consequence, the system is able to work with aluminium, steel or metallized permanent magnets more or less with the same efficiency. The output signal of these sensors A, B is therefore "influenced" only by the changes of the position of the spinning rotor 1 or the shaft 14 in relation to the sensors A, B and, as a result, it is not influenced by other negative influences. The output signal of each of these sensors A, B is subsequently processed by a connected detector D, as is illustrated in FIG. 3, using the principle of non-linear characteristic of the quadrupole, as will be described in greater detail further on. The output signal of the sensors A, B of the position of the spinning rotor 1 processed by the detector D is further used for the evaluation circuits and the control system of the active magnetic bearing. The above-mentioned facts connected with the sensors A, B created as high frequency transformers with pairs of coils on a common printed circuit board are the results of an optimalized construction of the used position sensors A, B. The high exciting frequency that is used—20 MHz and above—leads to the fact that the coils of the measuring transformers can have small inductance (in the order of tens to hundreds of nH), whereby the fact that the impedance of a coil grows with the increasing frequency of the used exciting signal is favourably used. In order to measure reliably by means of a measuring transformer it is necessary to work with a certain value of the impedance of the coils. On the other hand, small inductance of the coils of the measuring transformers means also a relatively small number of threads of these coils, or these flat coils. A small number of necessary threads of coils of measuring transformers together with the used high density of lines (conductors) on a printed circuit on which there are position sensors A, B, created as high frequency transformers with pairs of coils which are made using the new technology of the production of printed circuits, enables to create very small measuring transformers, typically e.g. with an area of 10-20 mm$^2$, which consequently enables the installation of position sensors A, B in the planes of their coils parallel to the measured surface of the rotating working means and not in a plane perpendicular to this axis, as is known from the background art. In addition, very small measuring transformers also permit using this solution for small diameters of a shaft of a rotating working means, where a "big" measuring transformer according to the background art could not be positioned parallel to the curved sensed surface of the shaft with a small diameter.

FIGS. 4 to 9 illustrate the principal variations of arrangement of electronic connection of detectors D using the principle of a non-linear transfer characteristic of a quadrupole for detection and evaluation of output signals of the sensors A, B of the position of the spinning rotor 1 in relation to the authentic rotation axis OI of the spinning rotor 1 in an active magnetic bearing.

Figure 4:
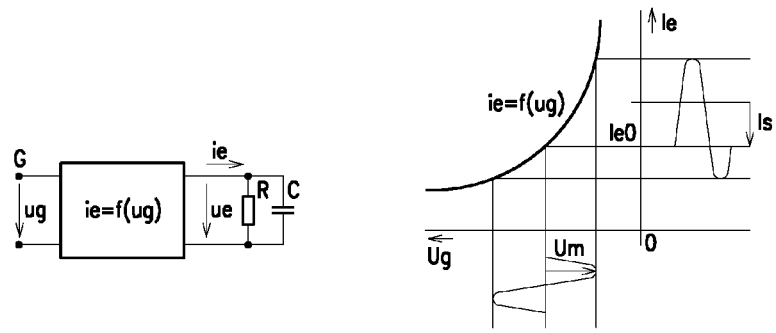

FIG. 4 (on the left-hand side) shows a general arrangement of a quadrupole with a non-linear transfer characteristic, whose principle is benefited from in the invention when using sensors A, B made as high frequency transformers with pairs of coils on a common printed circuit board.

The non-linear transfer characteristic, ie=f(ug) of the quadrupole is used for detection, for example by means a field-effect transistor, preferably then by means of a field-effect transistor J-Fet in a depletion mode (i.e. Philips BFR31) working in a suitably set working point with a total feedback.

Figure 5:
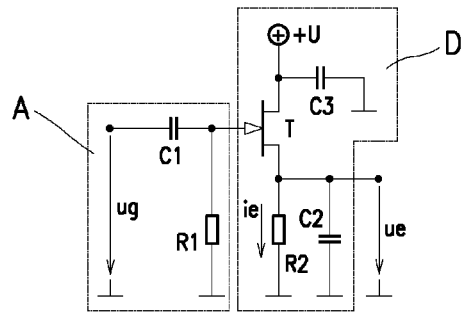
FIG. 5 shows an example of embodiment of connection of a circuit for detection and evaluation of the position of the rotor based on the principle of a non-linear transfer characteristic with the transistor J-Fet.

In this case it holds that if the inlet electrode G of the transistor J-Fet actuates by a high frequency AC signal, e.g. ug=Um·sin 2πft, the AC component of the output current ie nonzero mean value Is, depending on the amplitude of the input AC signal Um, which adds up to the idle output current Ie0 on condition that at the outlet of thus actuated transistor J-Fet there is an integrator with the time constant RC=T>>½πf. Then at the output of the quadrupole ue=R (Ie0+Is). It is advantageous that this circuit then works as a rectifier of even very small high frequency signals, namely continuously, virtually from values of zero and above, unless the amplitude of high frequency signal would have to be higher than for example threshold voltage of a common semiconductor diode. The only limitation of the method of using a non-linear transfer characteristic of a quadrupole is technological noise. FIG. 5 shows an example of embodiment of a connection of the transistor usable as a detector D of a high frequency output signal of sensors A, B of the position of the spinning rotor 1.

Figure 6:
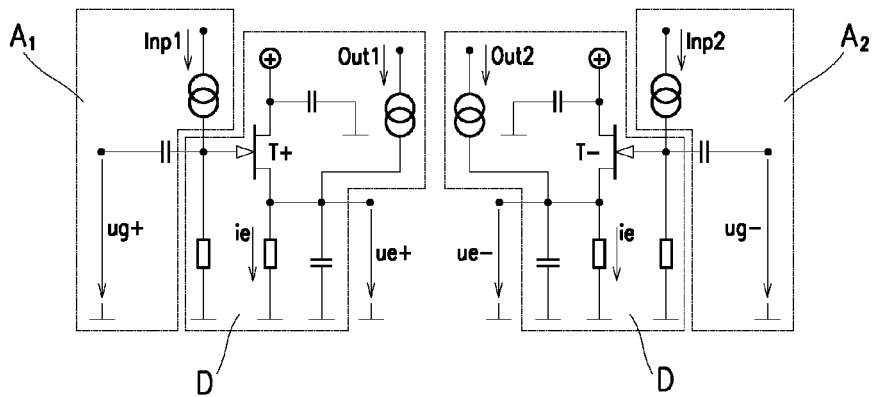
FIG. 6 illustrates an example of embodiment of a pair of sensors of the position of the spinning rotor with correction of variations in inputs as well as outputs.

FIG. 6 illustrates an example of embodiment of a connection of a pair of sensors A1, A2 or A3, A4 or B1, B2 or B3, B4 with transistors J-Fet for evaluation of a high frequency output signal of each pair of sensors A1, A2 or A3, A4 or B1, B2 or B3, B4. This example of embodiment of a connection is based on correction of mechanical and/or electrical and/or operational and/or other variations of the components used by feeding the correction siganl Inp1 and Inp2, Out1 and Out2. The correction signal enables unified setting of all produced active magnetic bearings according to real parameters of their individual components and elements, including the parameters of the sensors A, B, parts of the evaluation circuits and other components.

In FIG. 6 symbols Inp1 and Inp2 indicate correction signals fed to the inlets of the detector D and symbols Out1 and Out2 indicate the inlets for correction signals fed to the outlets of the detector D. Feeding a correction (DC) signal into both detectors D in this connection results in shifting the working points of the transistors J-Fet to the same positions on their non-linear characteristics, by which means at the outlets of both detectors D of each pair of sensors A1, A2 or A3, A4 or B1, B2 or B3, B4 of the spinning rotor 1 are the same output signals which are independent of the size of corrected variations. Afterwards follows further processing, usually differential, of these adjusted output signals of the detectors D, whose result is one output signal of each pair of sensors A1, A2 or A3, A4 or B1, B2 or B3, B4 and then it is possible to change the amplitude, offset, or, as the case may be, frequency progression independently of the above-mentioned correction.

Figure 7:
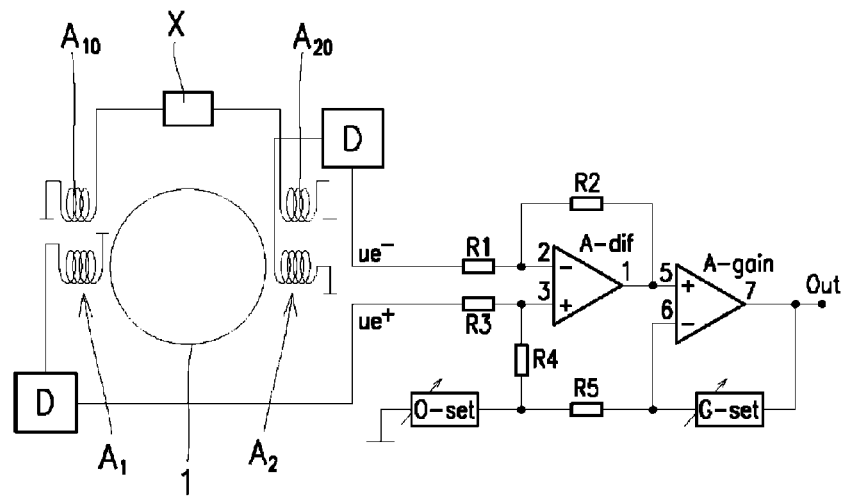
FIG. 7 shows an example of embodiment of connection of a differential circuit for the evaluation of the signals from two sensors of the position of the spinning rotor with a possibility of setting independently the resulting offset and the differential signal transfer.

FIG. 7 shows an example of embodiment of a connection of a differential circuit for evaluating the signals from two detectors D (e.g. detectors D according to FIG. 6) with a possibility of setting the resulting independent offset independently and of a difference signal transfer. In this connection ue− and ue+ indicate the voltages brought from the outlets of both detectors D in FIG. 6, Out is the resulting voltage for evaluating the difference ue+ and ue−, O-set are circuits for setting the correction of variations of the components of the system (generating a correction signal), which are preferably created as adjustable sources of DC voltage, and G-set are circuits for controlling the resulting transfer of the difference signal, the circuits being preferably created as an adjustable feedback network made up of resistances and condensers. FIG. 7 also shows an arrangement of exciting coils A10, A20 of the sensors A1, A2 of the position of the spinning rotor 1, whereby the exciting coils A10, A20 are connected to a source X of the high frequency exciting signal already mentioned as a frequency of 20 MHz and above.

Figure 8:
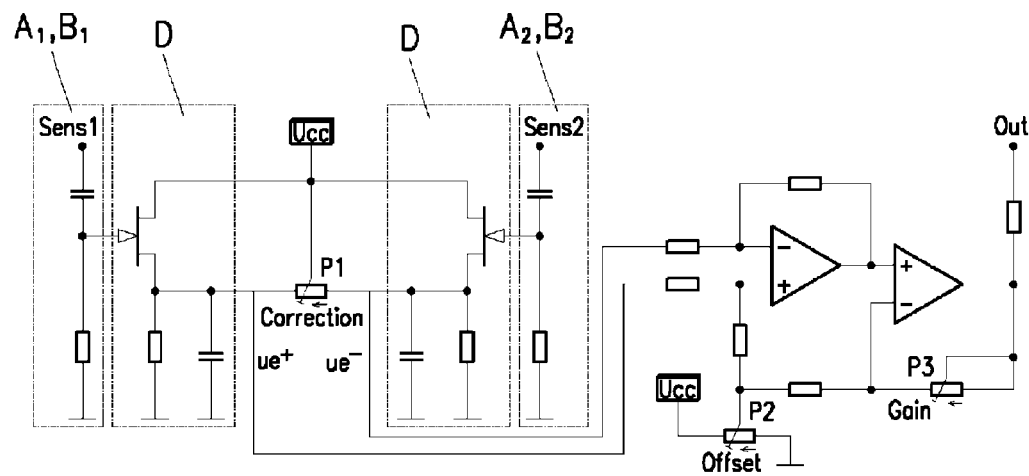
FIG. 8 shows an example of embodiment of connection of a pair of sensors of the position of the spinning rotor with transistors J-Fet, with the analog setting of the correction of variations and with the analog setting of the offset and intensifying the differential amplifier by means of variable resistances P1, P2 and P3.

FIG. 8 represents an example of embodiment of a combination of connection according to FIGS. 6 and 7 fo a pair of detectors D complemented by the analog setting of the correction of variations of the used components of the device and the analog setting of the offset and intensifying the differential amplifier by means of variable resistances P1, P2 and P3.

Figure 9:
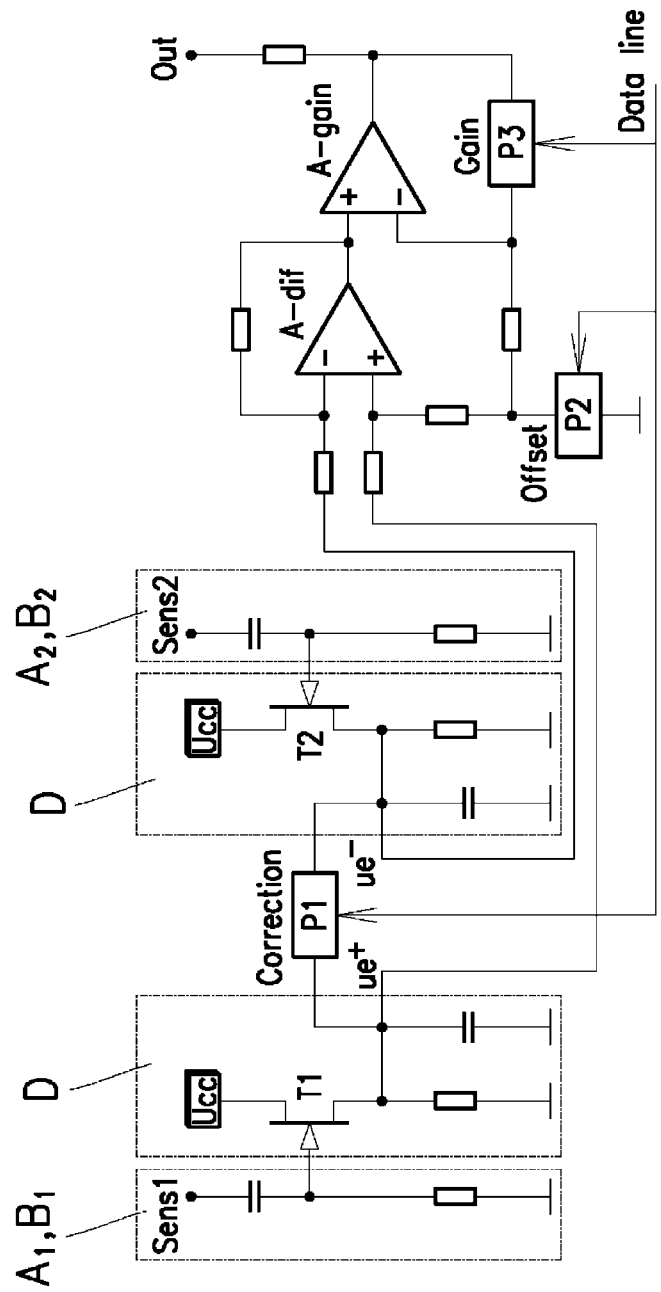
FIG. 9 represents an example of embodiment of the connection of a pair of sensors of the position of the spinning rotor with transistors J-Fet, with the digital setting of the correction of variations and with the digital setting of the offset and transfer characteristic of the differential amplifier by means of digitally controlled sources of voltage or currents P1, P2 and digitally controlled feedback network P3.

FIG. 9 shows an example of embodiment of a combination of connection according to FIGS. 6 and 7 for a pair of detectors D with digital setting of correction of variations of the used components of the device with digital setting of the offset and the transfer characteristic of the differential amplifier by means of digitally controlled sources of voltage or currents P1, P2 and digitally controlled feedback network P3.

It is apparent that from the electrotechnic point of it is possible to create a number of concrete connections which enable to create corresponding electronics for using the detector D composed of a quadrupole with a non-linear transfer characteristic for evaluation of output signals of the sensors A, B of the position of the spinning rotor 1, where the sensors A, B are with their outlets directly connected to the inlets of the detectors D.

Furthermore, detectors D and/or evaluation circuits may be created as a customer centered integrated circuit or there is a possibility of implementing individual components, including the sensors A, B, detectors D and evaluation circuits, on a common printed circuit board. In another embodiment also the control system of the active magnetic bearing is located on the common the printed circuit board together with the sensors A, B, detectors D and evaluation circuits.

What is claimed is:

1. A device for detecting position of a spinning rotor in an active magnetic bearing which comprises sensors for detecting radial shifting of the spinning rotor and sensors for detecting the inclination of the spinning rotor and further comprises detectors of an output signal of the sensors and evaluation circuits connected to a control system of the active magnetic bearing, wherein the sensors for detecting radial shifting of the spinning rotor and sensors for detecting the inclination of the spinning rotor are composed of high frequency transformers exactly with a pair of coils, each of the sensors is directly and separately from other sensors connected to the detector of the output signal of the respective sensor and each detector is formed by an electrical quadrupole with a non-linear transfer characteristic.

2. The device according to claim 1, wherein the electrical quadrupole with a non-linear transfer characteristic is a field effect transistor J-Fet in a depletion mode, working in a suitably set working point with a total feedback.

3. The device according to claim 1, wherein high frequency transformers comprise an exciting coil which is connected to a source of high frequency exciting signal having a frequency of at least 20 Mhz.

4. The device according to claim 1, wherein high frequency transformers are arranged on a two-sided printed circuit, whereby on one side there are exciting coils and on the other side there are sensing coils, planes of the coils are parallel to the sensed surface of the rotating working means.

5. The device according to claim 4, wherein the exciting coils and sensing coils have an inductance in order of tens to hundreds of nH and have an area in range from 10 to 20 mm$^2$.

6. The device according to claim 1, wherein high frequency transformers are arranged on a multi-layer printed circuit, whereby the exciting and/or sensing coils are arranged on inner layers of the multi-layer printed circuit and outer layers of the multi-layer printed circuit serve to protect the device from unfavorable influences of the environment and planes of the coils being parallel to the sensed surface of the rotating working means.

7. The device according to claim 1, wherein the position sensors are grouped into pairs and each of them is directly connected to the detector of its output signal, whereby outlets of the detectors of each pair of sensors are connected to a differential evaluation circuit of position of the rotating working means.

8. The device according to claim 7, wherein the detectors and/or evaluation circuits are provided with an inlet for the direct feeding of correction signals.

9. The device according to claim 1, wherein the detectors and/or evaluation circuits are composed of at least one integrated circuit.

10. The device according to claim 1, wherein the position sensors are along with its detectors and evaluation circuits located on a common board of printed circuits and the board is arranged in the active magnetic bearing assembly.

11. The device according to claim 10, wherein on the common board of printed circuit is arranged the control system of the active magnetic bearing.

12. The device according to claim 1, wherein the control system is a pulse width modulation system and wherein the device includes only one type of control system.

13. The device according to claim 1, wherein the magnetic bearing includes simple bearing coils separated from the coils of the sensors.

14. The device according to claim 1, wherein each high frequency transformer includes only two coils.

15. The device according to claim 14, wherein the rotor position is determined based on voltage differences in the coils by subtracting DC voltages obtained from the coils after rectification.

16. The device according to claim 1, wherein at least one pair of the sensors is arranged on a common axis such that, when the rotor is arranged between the at least one pair of the sensors, a difference in voltages from the at least one pair of the sensors is proportional to the position of the rotor.

17. The device according to claim 16, wherein only the voltage difference is used to determine rotor position.

* * * * *